June 24, 1930. J. D. MacMAHON 1,766,788
CHLORINE WEIGHING APPARATUS
Filed May 19, 1928    2 Sheets-Sheet 2
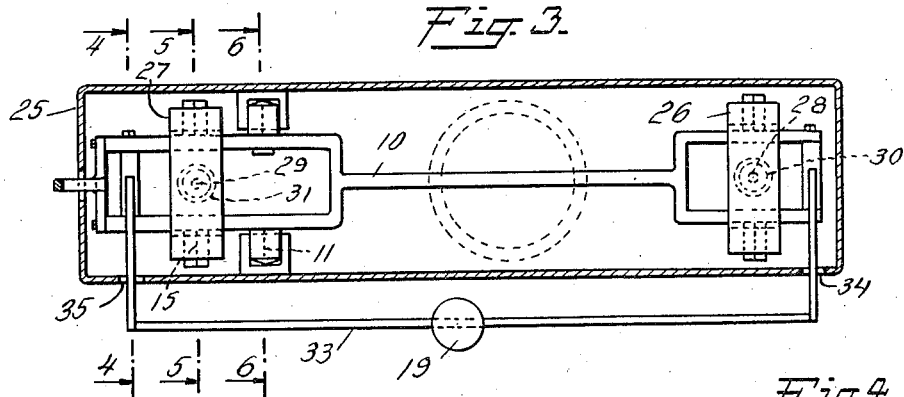
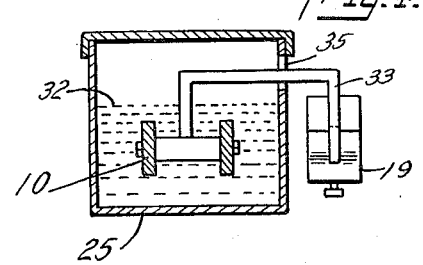
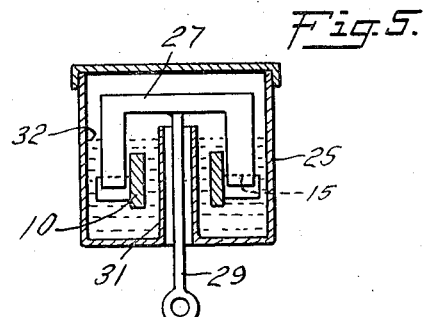
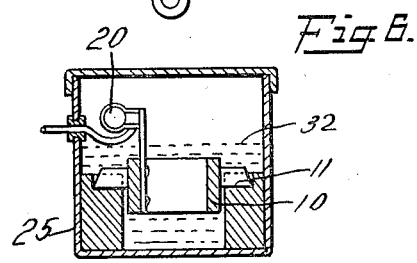
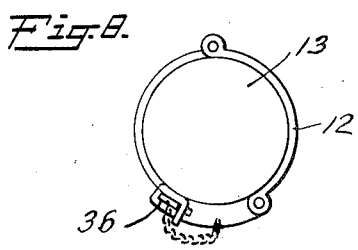
INVENTOR
James D. MacMahon
BY
ATTORNEYS Patented June 24, 1930

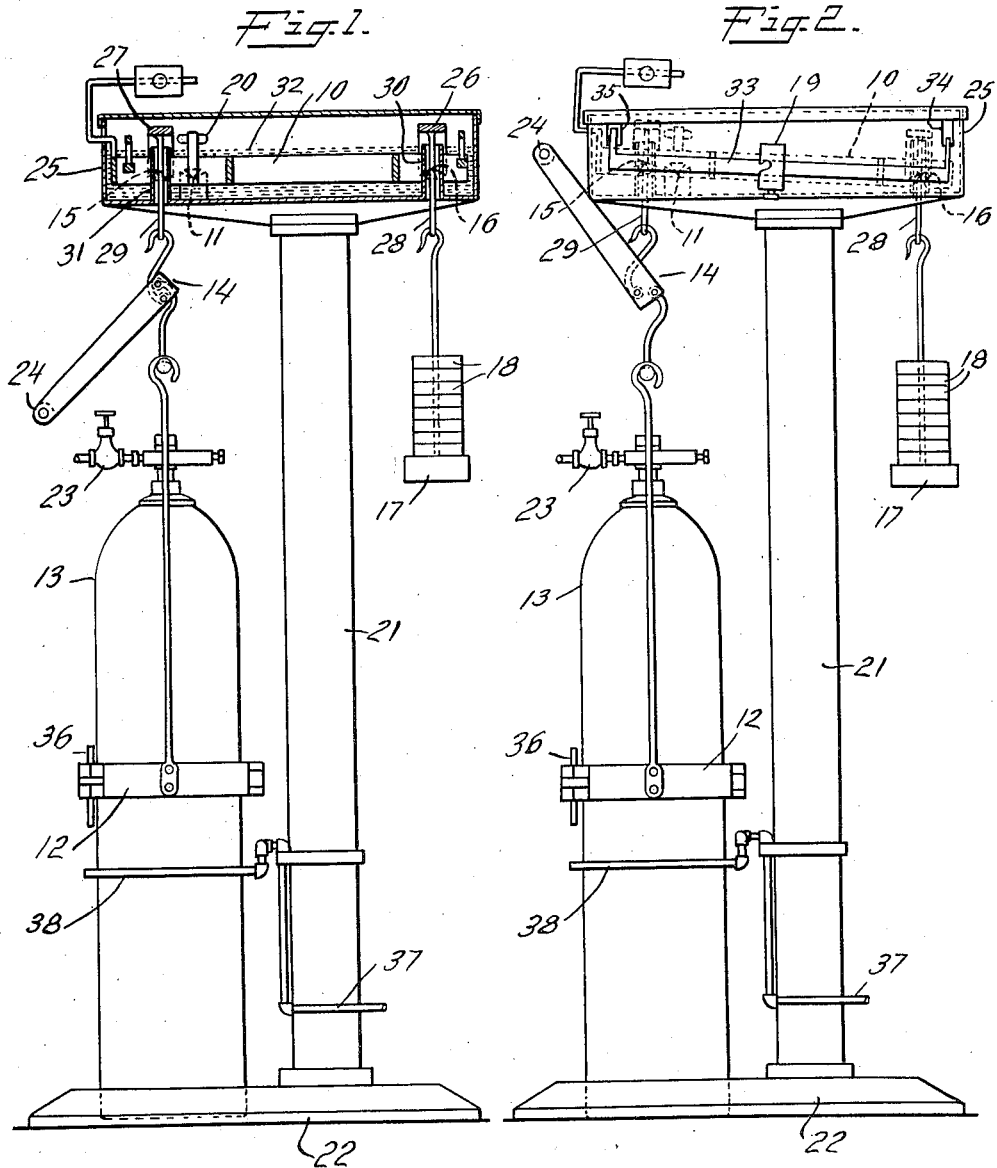

1,766,788

UNITED STATES PATENT OFFICE

JAMES DOUGLAS MACMAHON, OF NIAGARA FALLS, NEW YORK, ASSIGNOR TO THE MATHIESON ALKALI WORKS, INC., OF NEW YORK, N. Y., A CORPORATION OF VIRGINIA

CHLORINE-WEIGHING APPARATUS

Application filed May 19, 1928. Serial No. 278,996.

This invention relates to improvements in scales for supplying measured weights of liquid chlorine, in quantities in the neighborhood of five to ten pounds at a time, for example.

In laundry washrooms, bleach liquor is usually prepared in successive relatively small batches, the amount of chlorine used in the preparation of each batch approximating, for example, five to ten pounds. If the successive batches of bleach liquor are to be at all uniform, the successive increments of chlorine used must be measured fairly accurately. The common practice in laundry washrooms is to stand a cylinder of liquid chlorine, containing say 150 pounds of liquid chlorine, on a platform scales of conventional construction, tare the cylinder, and weigh out successive increments of chlorine by difference. This practice is unsatisfactory because accuracy and sensitivity of platform scales of conventional construction rapidly reach the vanishing point in such service. The conditions in most laundry washrooms, for example, are particularly severe, but the conventional platform scales also seems to be particularly subject to these conditions. For example, the conventional platform scales usually includes a relatively large number of pivots arranged beneath the platform adjacent the floor and, in this position particularly, corrosion rapidly renders such pivots useless in such service. The improved scales of the present invention provide particularly for simplified accurate weighing of chlorine under the conditions encountered, for example, in laundry washroom practice.

A scales embodying the invention is illustrated in the accompanying drawings and the invention will be particularly described in connection therewith. In the accompanying drawings, Fig. 1 is an elevation partly in section with parts broken away of a scales embodying the invention, Fig. 2 is another and similar elevation of the same scales, Fig. 3 is an enlarged detail of the scale beam and housing, Fig. 4 is a section on line 4—4 of Fig. 3, Fig. 5 is a section on line 5—5 of Fig. 3, Fig. 6 is a section on line 6—6 of Fig. 3, and Figs. 7 and 8 are details of the clamping means illustrated in Figs. 1 and 2.

The improved scales comprises a beam 10, pivoted at 11, having a short load carrying arm and a long weight carrying arm, clamping means 12 adapted to receive a standard container 13, a toggle mechanism 14 pivoted to the load carrying arm of beam 10 at 15, means pivoted to the weight carrying arm of beam 10 at 16 carrying a counter-poise 17 adapted to counter-balance the average standard container 13 and a plurality of aliquot weights 18, each corresponding to the amount of chlorine desired to be weighed out in successive increments, and an adjustable counter-poise 19 carried by beam 10 adapted to correct the variation in weight of the standard containers in which the chlorine is supplied. A position-operated switch 20 carried by beam 10 is advantageously provided to close a signal circuit when the weight carrying arm of beam 10 drops. This switch, for example, may be arranged to close a circuit operating either a visible or an audible signal. The weighing mechanism proper, the beam 10 and the pivots supporting this beam and supported by this beam, is carried at the upper end of a post 21 on a base 22.

The standard container illustrated at 13 is the usual steel cylinder in which liquid chlorine is supplied in quantities, for example, of 150 pounds. Chlorine is discharged from the upper end of this cylinder through valved connection 23.

In operation, the arm 24 of the toggle mechanism is raised (see Fig. 2), a chlorine cylinder rolled into position and clamped in the clamping means 12, the arm 24 of the toggle mechanism lowered (see Fig. 1) lifting the chlorine cylinder far enough to free the weighing mechanism, the weighing mechanism brought to an initial balance by adjustment of the counter-poise 19 with all of the aliquot weights 18 in position on the supporting means pivoted at 16, and successive increments of liquid chlorine then weighed out as required by successively removing the aliquot weights, stopping the flow of chlorine each time as the weight carrying arm of the beam 10 drops. When the chlorine cylinder is empty, the arm 24 of the toggle mechanism is raised again, the clamping means 12 released and the empty cylinder replaced with a full cylinder, as just described.

In the particularly advantageous form of the invention illustrated, the pivoted beam 10 and all of the pivots supporting this beam and supported by this beam are arranged within a container 25 adapted to receive a charge of a suitable liquid resisting the action of chlorine, a hydrocarbon oil, for example, so as to be submerged in this liquid in operation. Uncovered pivots may also be used, but in this case the pivots should be of material resistant to the attack of chlorine; the pivots proper may be of stellite and the pivot bearings of agate, for example.

In the scales illustrated, the pivots of the weighing mechanism are submerged in a protecting liquid and, further, the chlorine cylinder is suspended beneath the weighing mechanism. The exact construction of the weighing mechanism particularly illustrated is shown in more detail in Figs. 3 to 6. The beam 10 is crotched at each end and the weights and the chlorine cylinder are pivoted to the beam through yokes 26 and 27, respectively, through tie-rods 28 and 29, respectively, depending from the yokes through the crotches in the beam 10 and through wells 30 and 31, respectively, in the container 25 extending above the normal liquid level therein. The normal liquid level in the container 25 is indicated at 32 in Figs. 4 to 6. The arm 33 carrying the adjustable counterpoise 19 is carried from the ends of the beam 10 through slots 34 and 35 in the container 25 arranged above the normal liquid level therein. The container 25, and its cover forming a housing for the scale beam, the beam 10 and the yokes 26 and 27 may be of cast iron and the pivots and pivot bearings may be of pivot steel cast in the several parts as illustrated.

The clamping means particularly illustrated comprises a hinged hoop with a wedge closure means 36 (see Figs. 7 and 8) adapted to accommodate minor variations in size of the standard containers in which the chlorine is supplied.

A water connection 37 may be provided for spraying water on the chlorine container to supply heat for vaporizing the chlorine or for assisting in discharging the chlorine from the cylinder. In the apparatus illustrated, this water supply connection is connected with a pair of semi-circular perforated pipes 38 through a pair of nipples and elbow connections carried by post 21 arranged to permit the perforated pipes to be swung apart and together again when an empty chlorine cylinder is replaced. With the scales of the invention, this convenient means of supplying heat to the chlorine cylinder can be used without prejudice to the weighing mechanism.

One of the important advantages of the scales of the invention is the improvement in uniformity of operation it makes possible. This improvement is illustrated by the following table showing the available chlorine content of five successive batches of bleach liquor prepared in actual laundry washroom practice using the improved scales of the invention to measure the chlorine:

| Batch— | Grams per litre |
|---|---|
| 1 | 20.68 |
| 2 | 20.73 |
| 3 | 20.60 |
| 4 | 20.65 |
| 5 | 20.75 |

The improved scales of the invention has but a minimum number of pivots the operation of which is important to the accuracy and sensitivity of the weighing mechanism and all such pivots are arranged in an elevated position. In the particularly advantageous form of the invention illustrated, these pivots are further protected by submersion in a charge of a protecting liquid. The improved scales of the invention require but a minimum of floor space. They are convenient to use; for example, chlorine cylinders do not need to be lifted from the floor to a platform. The possibility of mistake is minimized by the provision of aliquot weights. In conjunction with these aliquot weights, the provision of an automatic signal still further reduces a possibility of mistake. The performance of the improved scales even under the severe conditions encountered in laundry washroom practice is reliably accurate and sensitive over long periods of time.

The invention has been described particularly in connection with the supplying of measured weights of liquid chlorine, but the invention is also useful in connection with the weighing of other liquefied gases where similar problems are encountered.

I claim:

1. An improved scales for supplying measured weights of liquefied gases comprising a pivoted beam having a short load carrying arm and a long weight carrying arm, clamping means adapted to receive a standard container, toggle means supporting said clamping means and pivoted to the load carrying arm of said pivoted beam, means for counterpoising the average standard container including an adjustable counter-poise carried by said pivoted beam adapted to correct for variation in weight of the standard container, weight carrying means pivoted to the weight carrying arm of said pivoted beam, and a plurality of aliquot weights adapted to be carried thereby.

2. An improved scales for supplying measured weights of liquefied gases comprising a pivoted beam having a short load carrying arm and a long weight carrying arm, clamping means adapted to receive a standard container, toggle means supporting said clamping means and pivoted to the load carrying arm of said pivoted beam, means for counterpoising the average standard container including an adjustable counter-poise carried by said pivoted beam adapted to correct for variation in weight of the standard container, weight carrying means pivoted to the weight carrying arm of said pivoted beam, a plurality of aliquot weights adapted to be carried thereby, and a container for said pivoted beam adapted to receive a charge of liquid resisting the action of such liquefied gas submerging the pivots supporting said pivot beam and supported by said pivoted beam.

3. An improved scales for supplying measured weights of liquefied gases comprising a pivoted beam having a short load carrying arm and a long weight carrying arm, clamping means adapted to receive a standard container, toggle means supporting said clamping means and pivoted to the load carrying arm of said pivoted beam, means for counterpoising the average standard container including an adjustable counter-poise carried by said pivoted beam adapted to correct for variation in weight of the standard container, weight carrying means pivoted to the weight carrying arm of said pivoted beam, a plurality of aliquot weights adapted to be carried thereby, and means for operating a signal when the weight carrying arm of said pivoted beam drops.

In testimony whereof I affix my signature.

JAMES DOUGLAS MacMAHON.